UNITED STATES PATENT OFFICE.

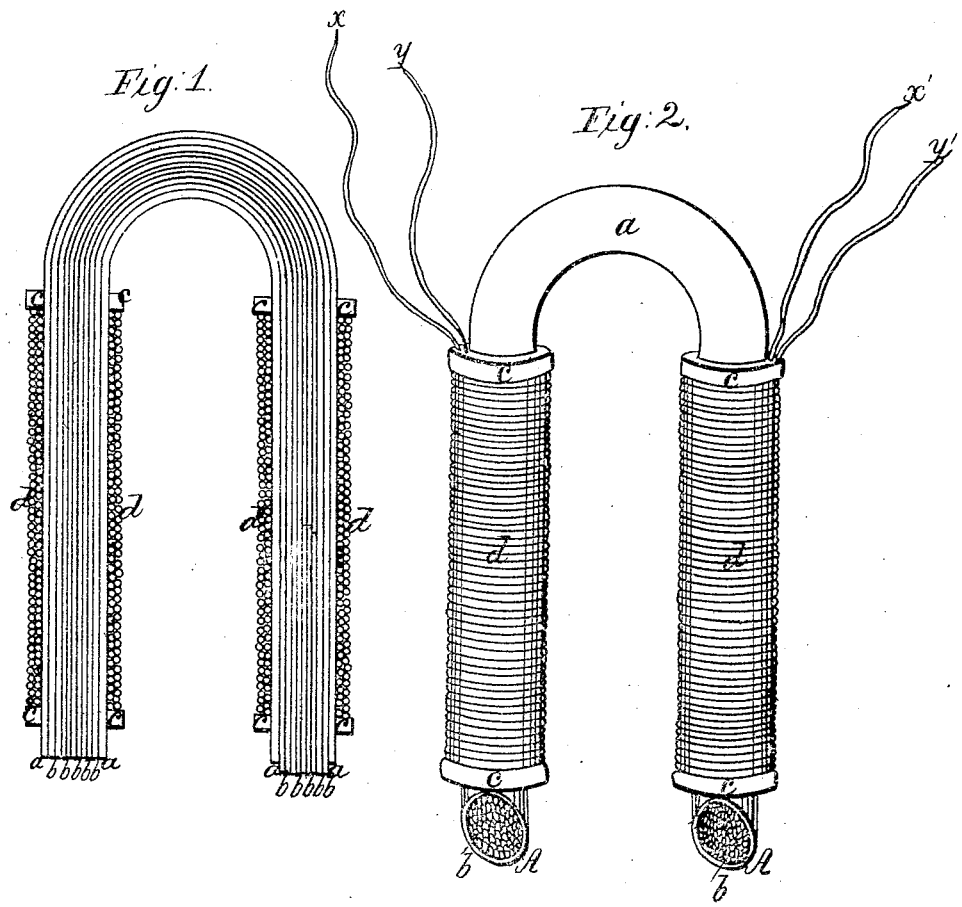

JOHN S. JENNESS, OF BANGOR, MAINE.

ELECTRO-MAGNET.

Specification forming part of Letters Patent No. 32,874, dated July 23, 1861.

*To all whom it may concern:*

Be it known that I, JOHN S. JENNESS, of Bangor, in the county of Penobscot and State Maine, have invented a new and useful or Improved Electro-Magnet; and I do hereby declare that the following is a full and exact description thereof, reference being had to the accompanying drawings, and to the letters of reference marked thereon—

Figure 1 being a horizontal section, and Fig. 2 a perspective view.

The nature of my invention consists in forming electro-magnets with a plurality of small wires or strips of soft iron bent in the U form, so that each wire, while under the magnetic influence, forms an entire and independent horseshoe-magnet; and, also, in surrounding the wires with a suitable metallic tube or casing; and, also, in terminating the soft-iron element of the magnet in a plane cutting the longitudinal axis of the magnet at an oblique angle; and, further, in constructing the helices of two or more insulated wires, so that by properly uniting the ends of the wires, as hereinafter shown, the electricity can pass in one continuous current through the entire length of wire forming the helices, as in the ordinary electro-magnets, and yet by disconnecting the wires the electric current can be divided into two or more separate currents, all operating in the same direction, whereby the magnet can be instantly changed from one operating with a current of intensity to one operating with a current of greater quantity, and vice versa.

To enable others skilled in the art to make and use my invention, I will proceed to describe its construction and operation.

In the drawings, $a$ represents the metallic tube or casing with which I surround the soft-iron wires.

$b\ b$ are the soft-iron wires which I use in constructing my magnet. The ends of the magnet terminate in the plane A, cutting the longitudinal axis of the magnet at an angle of about forty-five degrees.

$d\ d$ are the wires which form the helices, and $x\ y$ and $x'$ and $y'$ are the ends of the wires $d\ d$.

$c\ c$ are the tips or collars holding the helices in place.

In constructing my magnet I provide a metallic tube of soft iron, of suitable size and length, and fill it with wires of the desired size, and then, while heated, I curve the tube and wires to the desired form.

When the conducting-wires of the helices are both wound in the same direction, as in the drawings, and it is desired to use a current of greater intensity and less quantity, $x$ being connected with one pole of the battery, $y$ and $x'$ should be united, so that the electrical current can pass freely from one wire to the other, and $y'$ should be connected with the other pole of the battery.

When it is desired to change the magnet to one capable of working with electricity of greater quantity, $x$ and $x'$ should be connected with one pole of the battery and $y$ and $y'$ with the other pole of the battery; and to increase the capacity of the magnet from intensity to quantity helices composed of an additional number of independent insulated wires may be employed.

Among the advantages of my invention are, first, the ease and facility of its construction, its cost being but little, if any, more than the common solid horseshoe-magnet, and less than the magnets constructed of bundles of wires in the common form; second, the perfect connection of the two arms, there being no break in the continuity of the wires in passing from arm to arm, as in the common bundle of wire magnets; third, a magnet constructed by my method parts more readily with its magnetic properties upon breaking the circuit through the helices than the solid magnet; fourth, by forming the ends of the magnet at an angle, as described, it can be employed to operate laterally as well as in the direction of its length.

I do not claim as my invention the use of a bundle of wires as the soft-iron element in magnets as commonly constructed, nor do I claim the use of the insulated wire helices in electro-magnets as usually constructed; but What I do claim as my invention, and desire to secure by Letters Patent, is—

Constructing the core of electro-magnets of a bundle of single wires and placing said bundle of single wires in a tube and bending the tube and wires while hot into a U-shaped magnet, as described, and for the purposes set forth.

JOHN S. JENNESS.

Witnesses:
B. H. MACE,
J. W. STRUNGE.